UNITED STATES PATENT OFFICE.

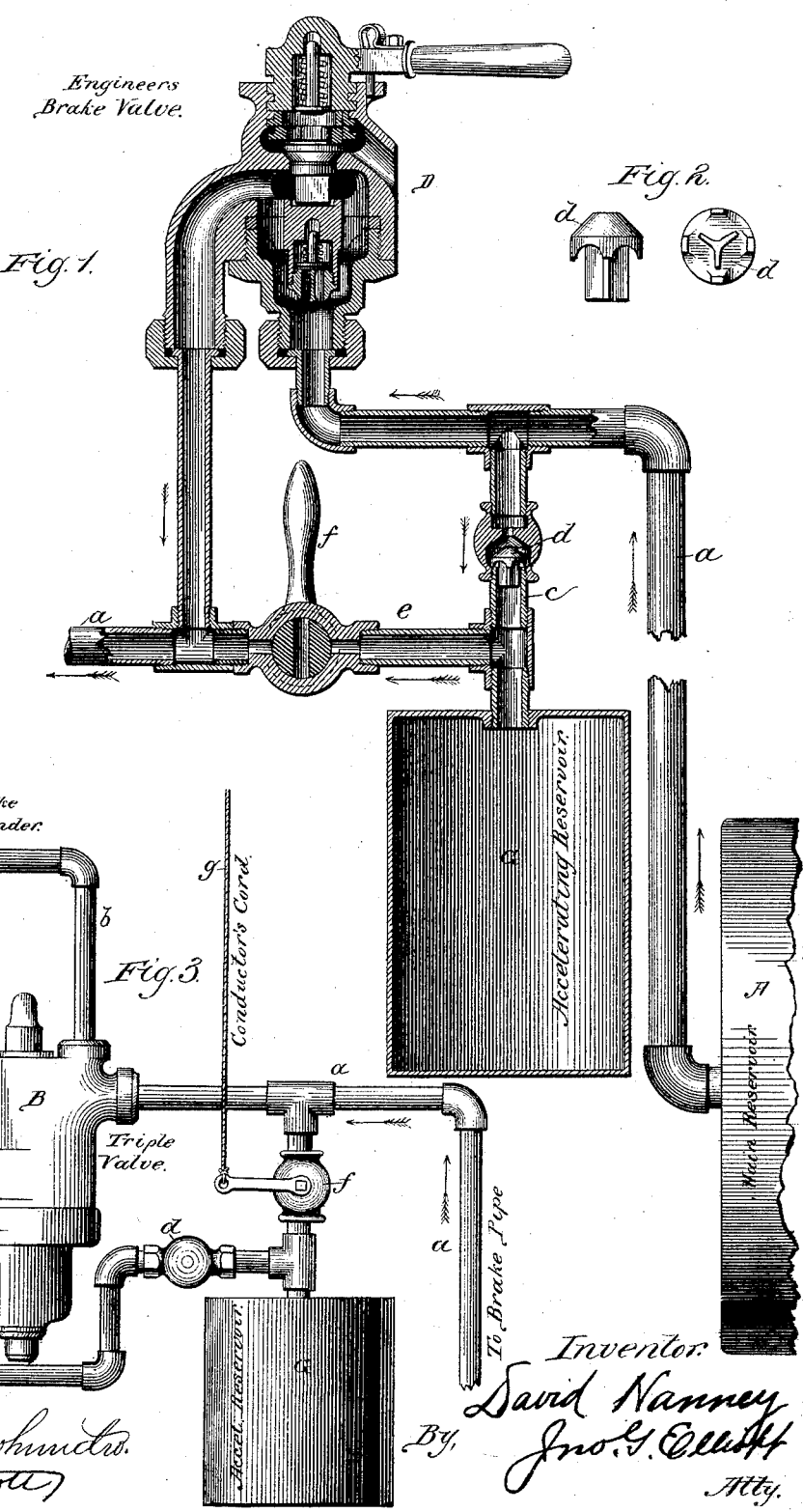

DAVID HANNEY, OF TURNER, ILLINOIS.

AIR-BRAKE.

SPECIFICATION forming part of Letters Patent No. 476,880, dated June 14, 1892.

Application filed November 23, 1885. Serial No. 183,697. (No model.)

*To all whom it may concern:*

Be it known that I, DAVID HANNEY, a citizen of the United States, residing at Turner, county of Du Page, and State of Illinois, have invented certain new and useful Improvements in Air-Brakes, of which the following is a specification.

This invention relates to improvements in air-brakes in which a triple valve is employed and seated by a pressure of air entirely and directly from the main reservoir on the engine, from which reservoir the supply of air is regulated or cut off by the engineer's brake-valve, the air being supplied to said main reservoir direct by an air-pump.

In the commonly-used and well-known constructions of air-brakes above referred to the triple valve frequently fails to respond to and seat itself promptly after the engineer's valve is open and communication is established between said reservoir and valve, because of the supply of air to the valve reducing the pressure in the reservoir and passage to the triple valve below that required to promptly seat the valve, and the result is that the brakes remain set when it is desirable that they should not.

The objects of this invention are to avoid this objection and to accelerate the seating of the valve by a controllable supply of air taken from the main reservoir or from the pumps thereof in such a manner that it will have a pressure equal to the maximum pressure in the reservoir or pumps, as the case may be, and may be released and directed to the triple valve after the air-pressure in the main reservoir or the pumps is reduced. I attain these objects by devices illustrated in the accompanying drawings, in which—

Figure 1 represents a sectional view in detail of an air-brake embodying my invention, in which the accelerating-reservoir is connected with the main reservoir at a point between said reservoir and brake-valve and with the pipe-passage leading from the brake-valve to the triple valve; Fig. 2, a side elevation and a bottom plan view of the check-valve between the accelerating-reservoir and main reservoir; Fig. 3, a detail side elevation illustrating the connection of the accelerating-reservoir with the auxiliary reservoir under the coach and next said valve, and a cord connection with the accelerating-reservoir, whereby the conductor or brakeman of the car may connect the same with the triple valve.

Similar letters of reference indicate the same parts in the several figures of the drawings.

The main reservoir A and the air-supply pump therefor (not shown) are located upon the engine and connected with the triple valve by a pipe or passage *a*. In this pipe or passage *a* is the engineer's brake-valve D, of any ordinary and well-known construction, and by which the triple valve, and hence the brakes, are under control of the engineer in the cab of the engine. The triple valve connects with an auxiliary reservoir E, and by a pipe *b* with the brake-cylinder F in the usual manner.

The construction and arrangement of the several parts, so far as described, are common and well known, and in operation, when the engineer's valve is unseated, there is an open passage between the main reservoir, the auxiliary reservoir, and the triple valve on the car or cars of the train, while at the same time the piston of the triple valve is elevated, and as a result communication between the triple valve and brake-cylinder is cut off and the brakes released.

To set the brakes, the engineer's valve is seated, thereby cutting out the main reservoir, and at the same time permitting an escape of air from the passage *a* throughout the exhaust-port of said valve. As soon as the air begins to escape a back-pressure of air occurs in the auxiliary reservoir, or else the piston of the triple valve is caused to fall by its own gravity to the limit of its downward stroke, and in so doing cut off the supply of air from the main reservoir through the triple valve to the auxiliary reservoir, and at the same time connect the auxiliary reservoir with the brake-cylinder, whereby the brakes are set.

In unsetting the brakes, as before described, by a supply of air from the main reservoir the pressure of air in said reservoir is correspondingly reduced, and frequently to such an extent that the air-pressure is not sufficient to quickly elevate the piston in the triple valve, and as a result the brakes are not released as quickly as desirable or as often necessary to prevent accident and valuable loss of time and speed; when in the latter case the train is merely slowed up. By my invention it is proposed to avoid this objection by employing what for convenience is termed an "accelerating-reservoir" G, which (see Fig. 1) is of the ordinary form of air-reservoirs, and has a pipe connection $c$ with the pipe or passage $a$ at a point between the engineer's brake-valve and the main reservoir, in which pipe connection is a check-valve $d$, constructed, as shown in Fig. 2, so that when not seated air may pass freely from the main reservoir into the accelerating-reservoir, and which is automatically seated, and communication with the main reservoir cut off during the time the air-pressure in the accelerating-reservoir is greater than that of the main reservoir. The accelerating-reservoir is, by a pipe $e$, also connected with the pipe $a$ rearward of the engineer's valve, in which pipe $e$ is a valve $f$ under control of the engineer, and closed when it is not desirable that air should escape from the accelerating-reservoir through the pipe $e$ to the triple valve. With this construction and with the engineer's brake-valve open and the valve $f$ closed air from the main reservoir will freely pass into the accelerating-reservoir, and also during the time when the brake-valve is closed; but at any moment when the pressure in the main reservoir is from any cause reduced from its maximum pressure the valve $d$ of the accelerating-reservoir will be seated by the back-pressure of air in said reservoir and close communication between the accelerating-reservoir and the main reservoir until the pressure in the latter has attained that of the former, when the valve $d$, by its own gravity, will unseat itself. In this connection it may be observed that no excess of pressure in the main reservoir over that in the accelerating-reservoir can operate to cut off communication between these two reservoirs, for there is always a passage around the check-valve $d$, except when said valve is elevated against its seat. From this construction it will be seen that the accelerating-reservoir not only derives its supply of air from the main reservoir, but may contain air under pressure in excess of that at times in the main reservoir. With this understanding I will suppose the engineer's brake-valve closed and the pressure in the main and accelerating-reservoirs to be seventy pounds, and that as soon as the brake-valve is opened the pressure in the main reservoir will be reduced to sixty pounds or less, and not sufficient to quickly elevate the piston of the triple valve, while at the same time the check-valve of the accelerating-reservoir has closed, and the pressure in said reservoir has remained at seventy pounds. It is now obvious that after the pressure in the main reservoir is reduced and the valve $f$ of the accelerating-reservoir is opened the pressure upon the piston of the triple valve will immediately be increased above sixty pounds to within a fraction of seventy pounds, or in any event to such an extent that the upward movement of the piston will be materially accelerated and quickness in unsetting the brakes be correspondingly promoted.

As above described and shown in Fig. 1, the accelerating-reservoir is under control only by the engineer and must do service for all triple valves in the train. In Fig. 3, however, the accelerating-reservoir is connected with the auxiliary reservoir of the triple valve and with the pipe $a$ immediately in front of the triple valve, and hence the accelerating-reservoir derives its supply of air from the auxiliary reservoir, and by means of a cord $g$ is under control of a conductor or brakeman on the car on which it is located, either of whom may connect the accelerating-reservoir with the triple valve at any moment found necessary or desirable by pulling the cord. In this latter construction the valve $f$ should be so constructed as to automatically close as soon as the cord is released. When the accelerating-reservoir is connected with the auxiliary reservoir, the check-valve $d$ will close as soon as communication is established between the auxiliary reservoir and the brake-cylinder, and will unseat under the same conditions as in the construction shown in Fig. 1.

My invention is not limited to the special form of valve and pipe connections between the accelerating-reservoir and the pipe $a$ and other reservoirs, for it is obvious that other well-known connections and valves may be employed and attain the same end—namely, the acceleration of the triple valve by a volume of air stored and released at a pressure above that of the supply-reservoirs connected with said valve.

Having described my invention, what I claim, and desire to secure by Letters Patent, is—

1. In an air-brake system, the combination of the triple valve and an accelerating air-reservoir G, connected thereto so as to accelerate the releasing of the valve, substantially as described.

2. In an air-brake system, the combination of a triple valve, an accelerating air-reservoir, an air-supply therefor, and a pipe or passage connecting said accelerating-reservoir with an air-supply pipe or passage for the triple valve, substantially as described.

3. In an air-brake system, the combination of a triple valve, the air-supply passage therefor, the main reservoir, and an accelerating-reservoir connecting with said supply-passage at a point between the main reservoir and the triple valve, substantially as described.

4. In an air-brake system, the combination of a triple valve, the main reservoir, an accelerating-reservoir, and a check-valve in the supply-passage of the accelerating-reservoir, substantially as described.

5. In an air-brake system, the combination of a triple valve, the main reservoir, the engineer's valve, and an accelerating-reservoir the supply and discharge passages of which respectively connect with the supply and discharge passages of the engineer's valve, substantially as described.

DAVID HANNEY.

Witnesses:
W. W. ELLIOTT,
WILL R. OMOHUNDRO.